May 28, 1957   D. S. WEISS   2,793,886
LOCKED CLEVIS
Filed Feb. 23, 1954

INVENTOR.
DEWEY S. WEISS
BY
Buckhorn and Cheatham
ATTORNEYS

United States Patent Office 2,793,886
Patented May 28, 1957

2,793,886

LOCKED CLEVIS

Dewey S. Weiss, Portland Oreg.

Application February 23, 1954, Serial No. 411,752

7 Claims. (Cl. 287—20.5)

My present invention comprises an improvement in clevises, the improvement comprising means whereby the clevis pin is locked against rotation as well as longitudinal movement during use whereby accidental displacement of the clevis pin is prevented.

The present invention is particularly designed for heavy duty clevises for use on tractors, farm implements, trucks, trailers, and other heavy equipment. Such a clevis should be able to accommodate draw bar eyes such as used on trailers, spliced cable eyes, heavy ropes or chains, and other traction devices. For safety sake the clevis must be positively locked against separation during usage, but on the other hand it must be easy to operate, preferably with one hand and while the operator is wearing gloves. In order that the clevis may have long life, the pin should be sturdy and should be prevented from turning in the clevis. The pin should be locked against axial displacement, not only to prevent separation of the clevis and pin but to prevent hammering and breakage of parts. The pin should be chained to the clevis in order that it may be conveniently accessible at all times and not lost in snow or mud, and the pin should be prevented from rotating which would foul the chain and possibly cause breakage thereof. The device should be weatherproof and its operation not be affected by mud, chips, dirt, debris, snow, ice, and other material which might fall into the clevis; it should have no springs or delicate parts, should be made of few, easily manufactured and serviced parts, should be rugged, tough, able to withstand hard use and abuse, and should comprise easily replaceable parts. The principal object of the present invention, therefore, is to provide a clevis device which will satisfy all of the foregoing requirements of a satisfactory clevis.

The objects and advantages of the present invention will be more readily apparent from inspection of the following specification, taken in connection with the accompanying drawings, wherein like numerals refer to like parts throughout, and in which a preferred embodiment of the invention is illustrated and described.

Figure 1:
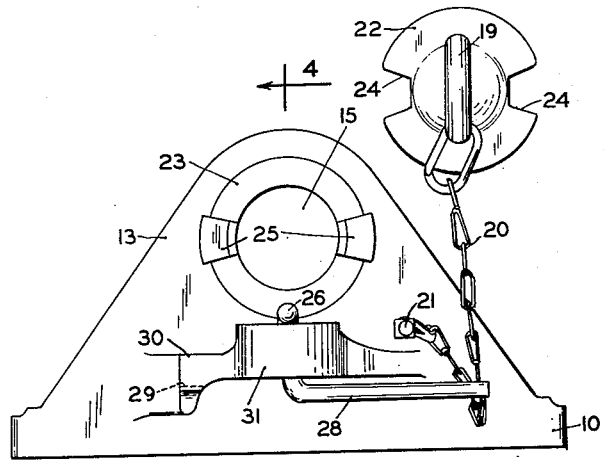
Fig. 1 is a plan view of the present invention in its normal mounted position, with the clevis pin removed from the clevis arms.
Figure 4:
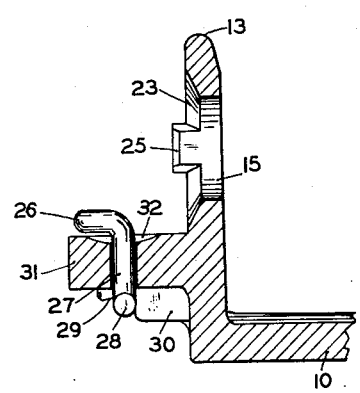
Fig. 4 is a vertical section taken along line 4—4 of Fig. 1.

It is to be appreciated that the present invention is preferably mounted on a piece of equipment so that the pivot pin is upright and falls into its seated position with the head thereof uppermost, but that the device is adapted to be mounted in any position. The clevis comprises a body 10 provided with a pair of openings 11, within countersinks 12, for reception of mounting bolts or rivets. The body is provided with a pair of integral arms, for convenience referred to as an upper arms 13 and a lower arm 14, which extend forwardly in vertically spaced relation to embrace an inserted draw bar eye or the like. The cleft between the arms is wide and open so that debris, mud or snow will not collect therein. The arms are provided with vertically aligned, pin receiving openings 15 and 16 respectively, for reception of the clevis pin 17 in the usual manner. The openings are preferably of a diameter snugly to embrace the cylindrical stem of the clevis pin while allowing free longitudinal movement, and the lower end of the clevis pin is preferably tapered as indicated at 18 to facilitate insertion of the pin, the tapered portion lying beneath the arm 14 when the pin is fully seated. The opposite end of the pin is provided with an eye 19 to facilitate handling thereof and a keeper chain 20 extends from the eye to a rivet 21 attaching the opposite end of the chain to the arm 13. The pin is provided with a limiting flange 22 of considerably larger diameter than the pin, the lower surface of which is concave and progressively thickened toward the pin, and the surface of the arm 13 surrounding the opening 15 is provided with an angularly flat countersink 23 for reception of the flange. The curvature of the flange 22 permits grime to collect on either the countersink surface or the flange without preventing full seating of the pin, and the curvature of the flange tends to squeeze any mud or other material from between the two surfaces.

Figure 2:
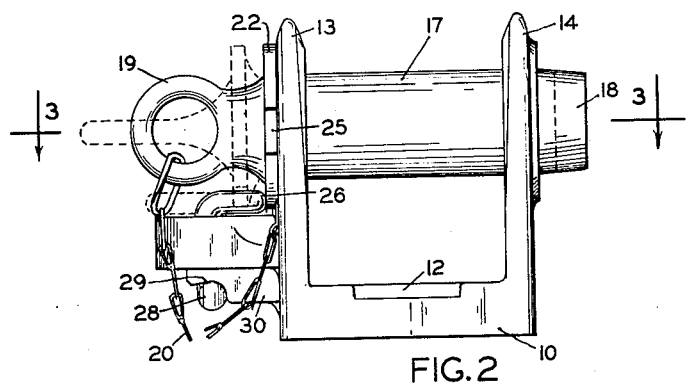
Fig. 2 is a side view of Fig. 1 with the clevis pin inserted and locked in position.

In accordance with the present invention the flange 22 is provided with a pair of diametrically opposed, deep notches 24 having radially disposed side walls, and the exterior surface of the arm 13 is provided with a pair of lugs 25 having correspondingly radially disposed side walls, which lugs are adapted to be received rather snugly in the notches 24. The inner edges of the lugs are preferably chamfered to prevent gouging and weakening of the flange 22. The lugs are relatively wide and are as thick in the axial direction as the flange 22. When the pin is fully seated as seen in Fig. 2, it is positively prevented from rotating by the interengaged lugs and notches.

In order to lock the pin in seated position, a latch comprising an elongated latch finger 26 is pivotally mounted on the arm 13 adjacent the opening 15, the latch finger 26 preferably comprising an integral portion of a single, shaped rod including a pivot portion 27 forming part of a crank including the crank arm 28. The latch finger is disposed substantially at right angles to the crank arm 28 and is movable from a latching position extending inwardly toward the arm 13 in axial alignment with the pin to a releasing position extending outwardly in axial alignment with the pin. Movement of the latch finger is effected by swinging the crank arm 28 through one hundred and eighty degrees from the position illustrated in Fig. 2 to the position illustrated in Fig. 1. The material from which the latch finger and integral crank is formed preferably comprises bronze bar stock of sufficient flexibility and resiliency that the crank arm may be snapped into a notch 29 in the surface of a boss 30 extending outwardly from the arm 13. The forward end of the boss, defining the entry lip of the notch 29, is disposed in the path of swinging movement of the upper surface of a portion of the crank arm whereby the crank arm may be forced into the notch and will snap thereinto to be retained against accidental displacement. When the latch is retained in the notch the latch finger 26 engages the exterior surface of the flange 22 to prevent axial displacment of the pin. The boss 30 provides a stiffening abutment for a pivot bracket 31 in which the pivot portion 27 of the latch crank is retained. The end of the aperture through the pivot member adjacent the latch finger 26 is preferably countersunk as indicated at 32 in order that the latch finger 26 may lie closely adjacent the surface of the bracket without requiring right angle bending of the rod of which the latch finger is an integral portion. Replacement of a worn latch finger forming member may be accomplished by removing the old member in any convenient fashion and inserting a new one which has not been formed to provide a right angle bend between the pivot portion 27 and the crank arm 28, and thereafter bending the member. The tip of the latch finger 26 is preferably rounded to facilitate movement of the latch finger to locking position against the flange 22, and the length of the latch finger is such that any movement of the pivot pin in the axial direction is positively prevented.

Figure 3:
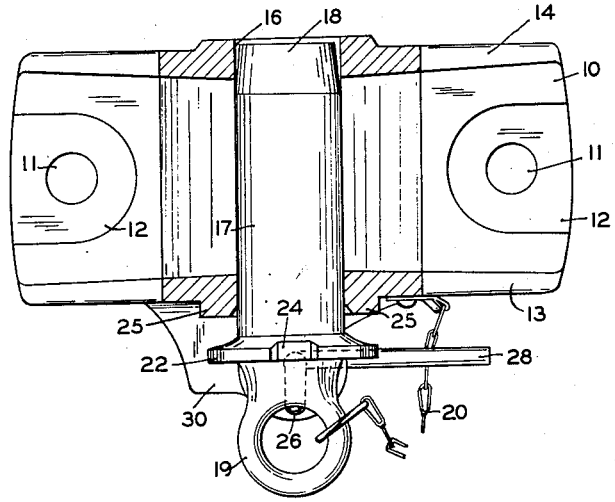
Figure 3 is a vertical section taken along 3—3 of Fig. 2 with the clevis pin the unlocked and partially removed position.

The latch finger 26 projects from the bracket 31 into the path of movement of the flange 22, but the diameter of the latch finger is less than the width and depth of either of the notches 24. The latch finger is positioned angularly about the axis of the opening 15 with respect to the lugs 25 whereby withdrawal of the clevis pin can only be effected upon movement of the latch finger to its releasing position, partial withdrawal of the clevis pin to the position shown in dotted outline in Fig. 2, and partial rotation of the clevis pin to the position shown in Fig. 3 in order to align one of the notches with the outwardly extending latch finger. There are thus three separate movements required to withdraw the latch pin to an extent that the end thereof clears the lower arm 14. It is improbable that these three coordinated movements could accidentally happen in proper sequence during use of the clevis.

Having illustrated and described a preferred embodiment of the present invention, it should be apparent to those skilled in the art that the same permits of modification in arrangement and detail. I claim as my invention all such modifications as come within the true spirit and scope of the appended claims.

I claim:

1. In a clevis having perforated arms for reception of a clevis pin, the improvement comprising an integral lug on one of the arms adjacent its pin receiving opening, an integral limiting flange on the clevis pin, said flange having a notch therein for close reception of said lug to prevent rotation of said clevis pin when seated, and a latch movably mounted on the exterior of said one arm for movement into engagement with the exterior surface of said flange to prevent longitudinal movement of said clevis pin from its seated position, said latch being mounted in arcuately spaced relation to said lug and within the path of movement of said flange when said clevis pin is being withdrawn or inserted, said latch being movable to a releasing position spaced from said flange in the axial direction of said clevis pin for permitting partial withdrawal of said clevis pin to disengage said lug from said notch whereby said clevis pin may be partially rotated to align said notch with said latch, and said latch when in releasing position relatively passing through said notch during complete withdrawal of said clevis pin.

2. In a clevis having perforated arms for reception of a clevis pin, the improvement comprising an integral lug on the exterior surface of one of the arms adjacent its pin receiving opening, an integral limiting flange on the clevis pin, said flange having a notch therein for reception of said lug to prevent rotation of said clevis pin when seated, and a latch pivotally mounted on the exterior of said arm and comprising an elongated latch finger pivotally movable from a latching position, extending inwardly parallel to the axis of said pin and engaging the outer surface of said flange when the pin is seated, to a releasing position, extending outwardly parallel to the axis of said pin, the pivotal axis of said latch finger being angularly spaced from said lug with respect to the axis of said opening and said latch finger lying in the path of said flange whereby complete withdrawal of said pin may be effected only upon movement of said latch finger to its releasing position, partial withdrawl of said pin to position the flange beyond said lug and partial rotation of said pin to align said notch with said latch finger.

3. The construction set forth in claim 2 wherein said arm is provided with a diametrically opposed pair of such lugs on opposite sides of said opening, said flange is provided with a diametrically opposed pair of such notches, and said latch finger is positioned midway between said lugs, whereby said partial rotation of the pin to effect withdrawal thereof may be one quarter of a complete rotation in either direction.

4. The construction set forth in claim 2 wherein said notch and said lug each have side surfaces extending radially with respect to said pin and said opening, respectively.

5. In a clevis having perforated arms for reception of a clevis pin, the improvement comprising an integral lug on the exterior surface of one of the arms adjacent its pin receiving opening, an integral limiting flange on the clevis pin, said flange having a notch therein for reception of said lug to prevent rotation of said clevis pin when seated, a bracket extending outwardly from said one arm, a latch pivotally mounted on said bracket and comprising an elongated latch finger pivotally movable from a latching position, extending inwardly parallel to the axis of said pin and engaging the outer surface of said flange when the pin is seated, to a releasing position, extending outwardly parallel to the axis of said pin, the pivotal axis of said latch finger being angularly spaced from said lug with respect to the axis of said opening and said latch finger lying in the path of said flange whereby complete withdrawal of said pin may be effected only upon movement of said latch finger to its releasing position, partial withdrawal of said pin to position the flange beyond said lug and partial rotation of said pin to align said notch with said latch finger, a latch operating crank fixed to said latch finger for effecting movement thereof, and means to retain said crank when said latch finger is moved to its latching position.

6. In a clevis having perforated arms for reception of a clevis pin, the improvement comprising an integral lug on the exterior surface of one of the arms adjacent its pin receiving opening, an integral limiting flange on the clevis pin, said flange having a notch therein for reception of said lug to prevent rotation of said clevis pin when seated, a bracket extending outwardly from said one arm, a latch pivotally mounted on said bracket and comprising an elongated latch finger pivotally movable from a latching position, extending inwardly parallel to the axis of said pin and engaging the outer surface of said flange when the pin is seated, to a releasing position, extending outwardly parallel to the axis of said pin, the pivotal axis of said latch finger being angularly spaced from said lug with respect to the axis of said opening and said latch finger lying in the path of said flange whereby complete withdrawal of said pin may be effected only upon movement of said latch finger to its releasing position, partial withdrawal of said pin to position the flange beyond said lug and partial rotation of said pin to align said notch with said latch finger, a latch operating crank fixed to said latch finger for effecting movement thereof, and means to retain said crank when said latch finger is moved to its latching position comprising a boss extending outwardly from said arm in position to engage said crank and having a notch therein, said crank being resiliently flexible whereby it may be snapped into the notch of said boss.

7. The construction set forth in claim 6 wherein said crank and said latch finger comprise integral portions of a single member.

References Cited in the file of this patent

UNITED STATES PATENTS

| | | |
|---|---|---|
| 389,493 | Baker | Sept. 11, 1888 |
| 474,747 | Kirby | May 10, 1892 |
| 1,715,975 | Angell | June 4, 1929 |
| 2,326,635 | Gold | Aug. 10, 1943 |